United States Patent [19]

Dietrich

[11] Patent Number: 5,633,903

[45] Date of Patent: May 27, 1997

[54] METHOD FOR DISMANTLING BULKY PARTS OF PRESSURE-VESSEL FITTINGS OF A NUCLEAR PLANT

[75] Inventor: Alban Dietrich, Hassloch, Germany

[73] Assignee: ABB Reaktor GmbH, Mannheim, Germany

[21] Appl. No.: 573,727

[22] Filed: Dec. 18, 1995

[30] Foreign Application Priority Data

Dec. 16, 1994 [DE] Germany .................. 44 45 168.7

[51] Int. Cl.$^6$ ................................................ G21C 19/00
[52] U.S. Cl. ................. 376/260; 376/272; 83/54; 83/167; 29/426.3
[58] Field of Search ..................... 376/260, 261, 376/272; 83/13, 27, 54, 167; 29/426.2, 426.3

[56] References Cited

U.S. PATENT DOCUMENTS

| 4,223,581 | 9/1980 | Markiewicz | 83/167 |
| 4,290,906 | 9/1981 | Saito et al. | 376/260 |
| 5,037,604 | 8/1991 | Bauer et al. | 376/260 |
| 5,227,123 | 7/1993 | Baverstern | 376/260 |
| 5,298,196 | 3/1994 | Heung | 376/260 |

FOREIGN PATENT DOCUMENTS

| 222997 | 5/1985 | German Dem. Rep. | 376/260 |
| 4031153 | 4/1992 | Germany | 376/260 |

*Primary Examiner*—Harvey E. Behrend

[57] ABSTRACT

Pressure vessels of nuclear plants are equipped with so-called pressure-vessel fittings for the purpose of receiving fuel assemblies. If a bulky part of that type is to be exchanged, very large transport containers for transporting to a location outside the nuclear plant are required. In order to ensure that smaller transport containers can be used, it is necessary to dismantle the bulky parts. In order to ensure that the dismantling operation can be carried out without complicated holding devices, provision is made for setting down an open transport container on the bottom of a water tank. A bulky part is inserted into the transport container and the bulky part projects a predeterminable amount above an end surface of the transport container. The bulky part is separated above the end surface through the use of a separating device disposed on the end surface of the transport container.

1 Claim, 3 Drawing Sheets

METHOD FOR DISMANTLING BULKY PARTS OF PRESSURE-VESSEL FITTINGS OF A NUCLEAR PLANT

BACKGROUND OF THE INVENTION

FIELD OF THE INVENTION

The invention relates to a method for dismantling bulky parts of pressure-vessel fittings of a nuclear plant into transportable part-sizes, which includes inserting a bulky part into an open transport container with the bulky part projecting by a predeterminable amount above an end surface of the transport container, supporting a separating device on the end surface of the transport container and fixing the separating device relative to the transport container, and separating the bulky part above the end surface.

A method of that type is known from Published East German Application DD 222 997 A1. There, an absorber element being formed of a plurality of absorber rods is drawn out of a fuel assembly of a pressurized-water reactor into a transfer container. A ceiling is provided with a plurality of transfer wells, into each of which an ultimate-storage container that is open at the top is inserted. A separating device which is set down at the end surface of the ultimate-storage container has a top side on which the transfer container having the absorber element rests. The absorber element is then moved a predeterminable amount into the ultimate-storage container and is sheared off through the use of the separating device. Positioned underneath the ceiling is a transport container, into which the loaded ultimate-storage container is inserted. The method according to Published East German Application DD 222 997 A1 requires a very deep water tank, since disposed above the separating device is the transfer container which is at least 4 m long and above which a sufficient water covering of several meters is still necessary for shielding reasons. Furthermore, the provision of a plurality of containers (transfer, ultimate-storage and transport containers) is required.

German Published, Non-Prosecuted Patent Application DE 40 31 153 A1 discloses an installation for the comminution of fuel-element cans. The fuel-element can is introduced into an introduction well and is supported on the bottom of a slide-guide chamber. A shearing slide detaches part of the fuel-element can and pushes the detached part to an ejection device. A container is disposed underneath the ejection device and receives the detached part.

SUMMARY OF THE INVENTION

It is accordingly an object of the invention to provide a method for dismantling bulky parts of pressure-vessel fittings of a nuclear plant, which overcomes the hereinaforementioned disadvantages of the heretofore-known methods of this general type and which makes do with few containers and with a small water-tank depth.

With the foregoing and other objects in view there is provided, in accordance with the invention, a method for dismantling bulky parts of pressure-vessel fittings of a nuclear plant into transportable parts of smaller sizes, which comprises a) setting down a bottom part of an open transport container on a bottom of a water tank; inserting a bulky part into the bottom part of the open transport container; moving a casing part of the open transport container over the inserted bulky part like a sleeve until the casing part contacts the bottom part and the bulky part projects a predeterminable amount above an end surface of the casing part; connecting the casing part to the bottom part; supporting a separating device on the end surface of the transport container and fixing the separating device relative to the transport container; and separating the bulky part above the end surface of the casing part with the separating device.

Thus, the transport container, which is necessary in any case at a later time, serves for receiving the bulky part during the separating operation, so that a complicated holding device for the bulky part and the separating device supported on the transport container are dispensed with. Furthermore, there is no need to lift the bulky part above the end surface of the transport container, thereby always guaranteeing a sufficient water covering.

Other features which are considered as characteristic for the invention are set forth in the appended claims.

Although the invention is illustrated and described herein as embodied in a method for dismantling bulky parts of pressure-vessel fittings of a nuclear plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
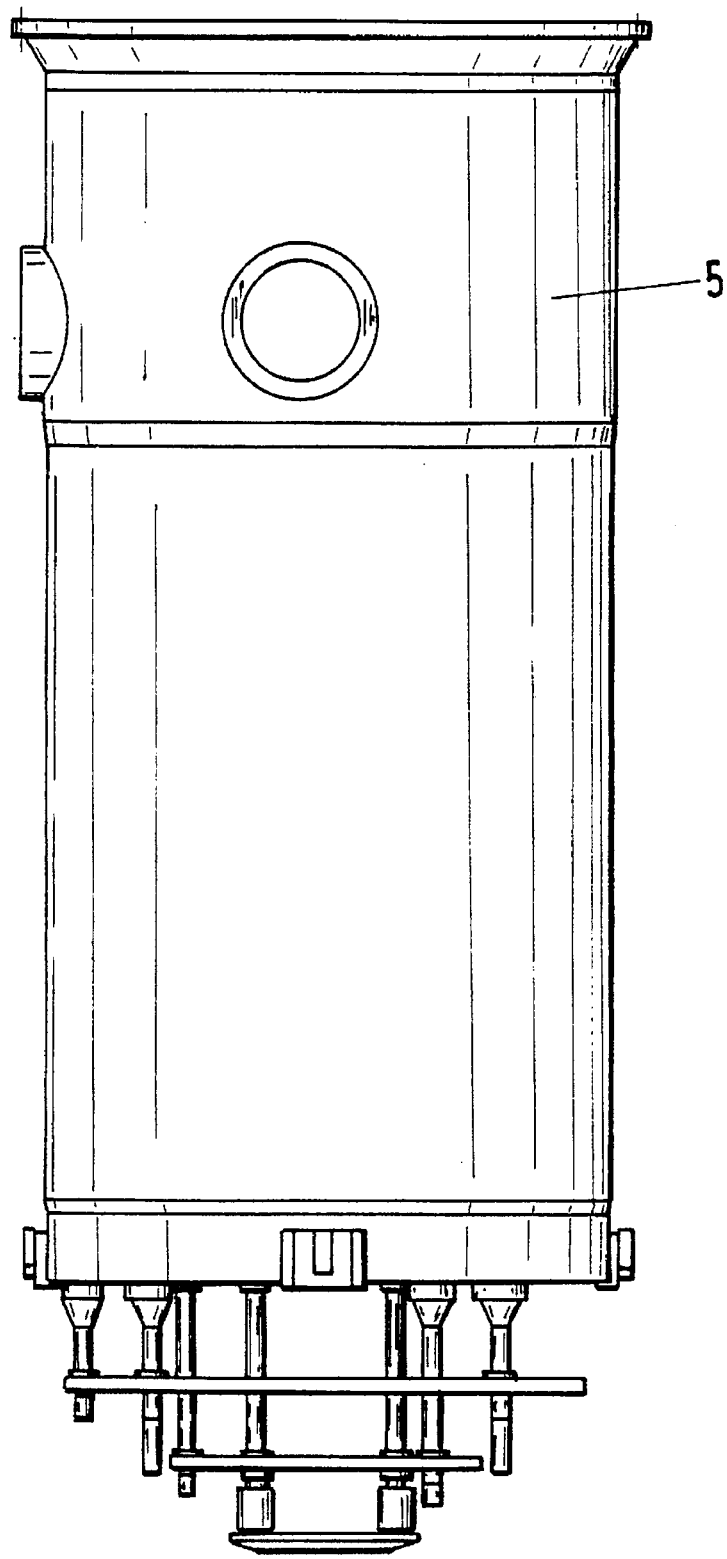
FIG. 1 is a diagrammatic, elevational view of a core container which has already been extracted from a pressure vessel and is in its vertical position.
Figure 2:
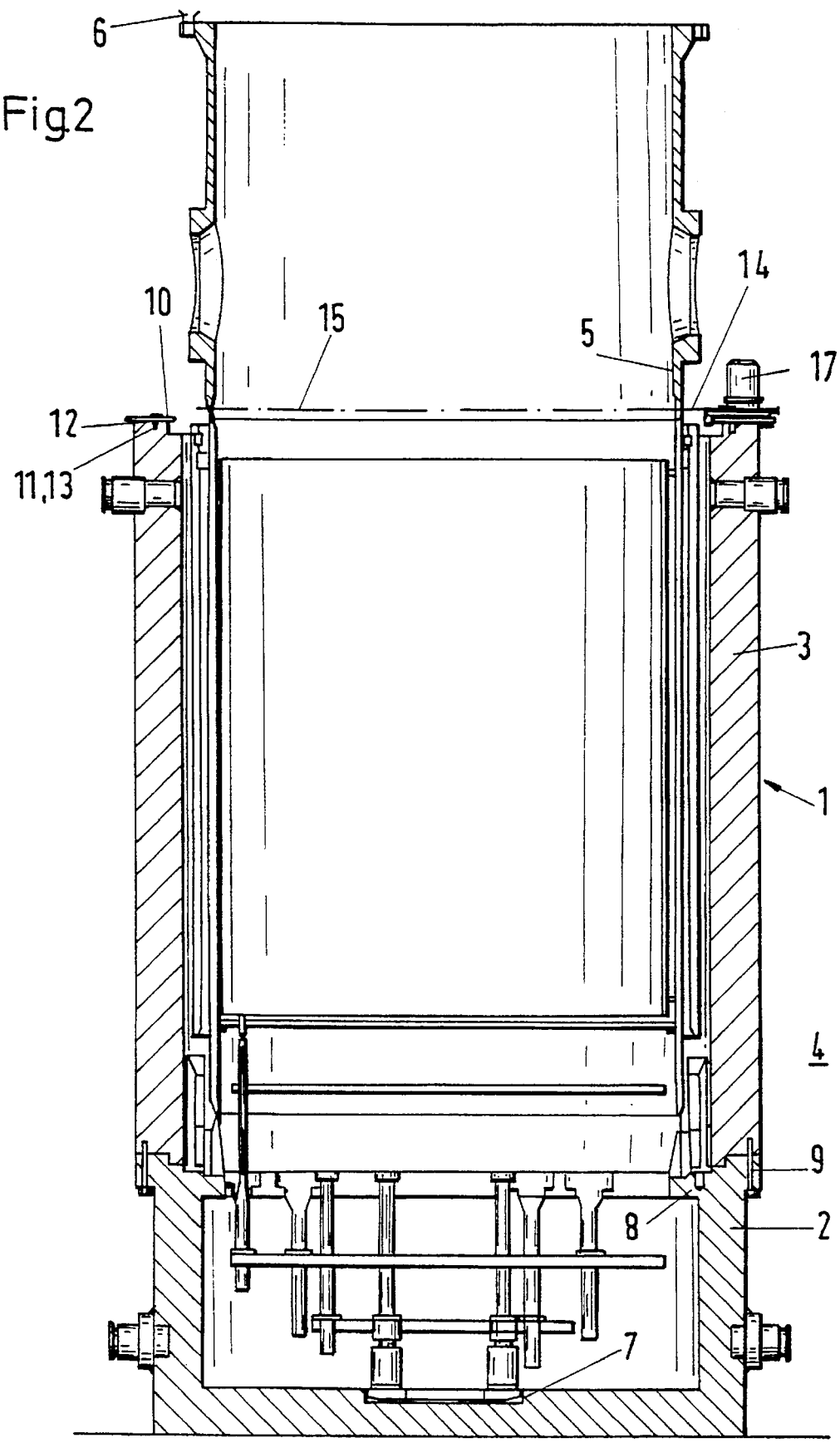
FIG. 2 is a partly longitudinal-sectional view of an open transport container with an inserted core container, and a separating device.

Referring now to the figures of the drawing in detail and first, particularly, to FIG. 1 thereof, there is seen a core container 5 which constitutes the most bulky part of core fittings and which can have an outside diameter of approximately 4 m and a longitudinal extension of approximately 10 m. As is evident from FIG. 2, an open transport container 1 serves as a receiving device for the core container 5 during a dismantling operation. The transport container 1, which is formed of a bottom part 2 and a cylindrical casing part 3, is set down in a water tank 4. After the bottom part 2 is set down on the bottom of the water tank 4, the core container 5 is inserted into the bottom part through the use of a lifting appliance indicated by reference numeral 6. The core container is supported in a recess 7 of the bottom part 2 and the core container underogoes a laterally supporting centering in the region of a flange 8 of the bottom part 2. The introduction of the core container, with the casing part 3 removed, guarantees a sufficient water covering during insertion into the bottom part 2. After the core container has assumed its position in the bottom part 2, the casing part 3 is lowered axis-parallel to the core container 5 through the use of the lifting appliance 6. After the casing part 3 has been placed on the bottom part 2, a screw connection is made.

A circular rail 10 for receiving a separating device 17 is then set down on a free end surface 12 of the casing part 3.

The circular rail 10 is fixed relative to the casing part 3 and therefore to the transport container 1 through the use of anchoring elements 13 engaging in threaded bores 11 associated with the end surface. The separating device is moved along the circular rail 10 and at the same time the separating device uses a separating tool 14 to separate the core container 5 along a separating line 15 indicated by dot-dash lines. During the separating operation, the lifting appliance 6 remains fastened to the core container 5. Consequently, on one hand, the stable configuration of the core container during the separating operation and, on the other hand, an immediate holding of the detached part after the termination of the separating operation, are ensured. The detached part can be inserted directly into a further transport container or be set down on the bottom of the water tank 4.

Figure 3:
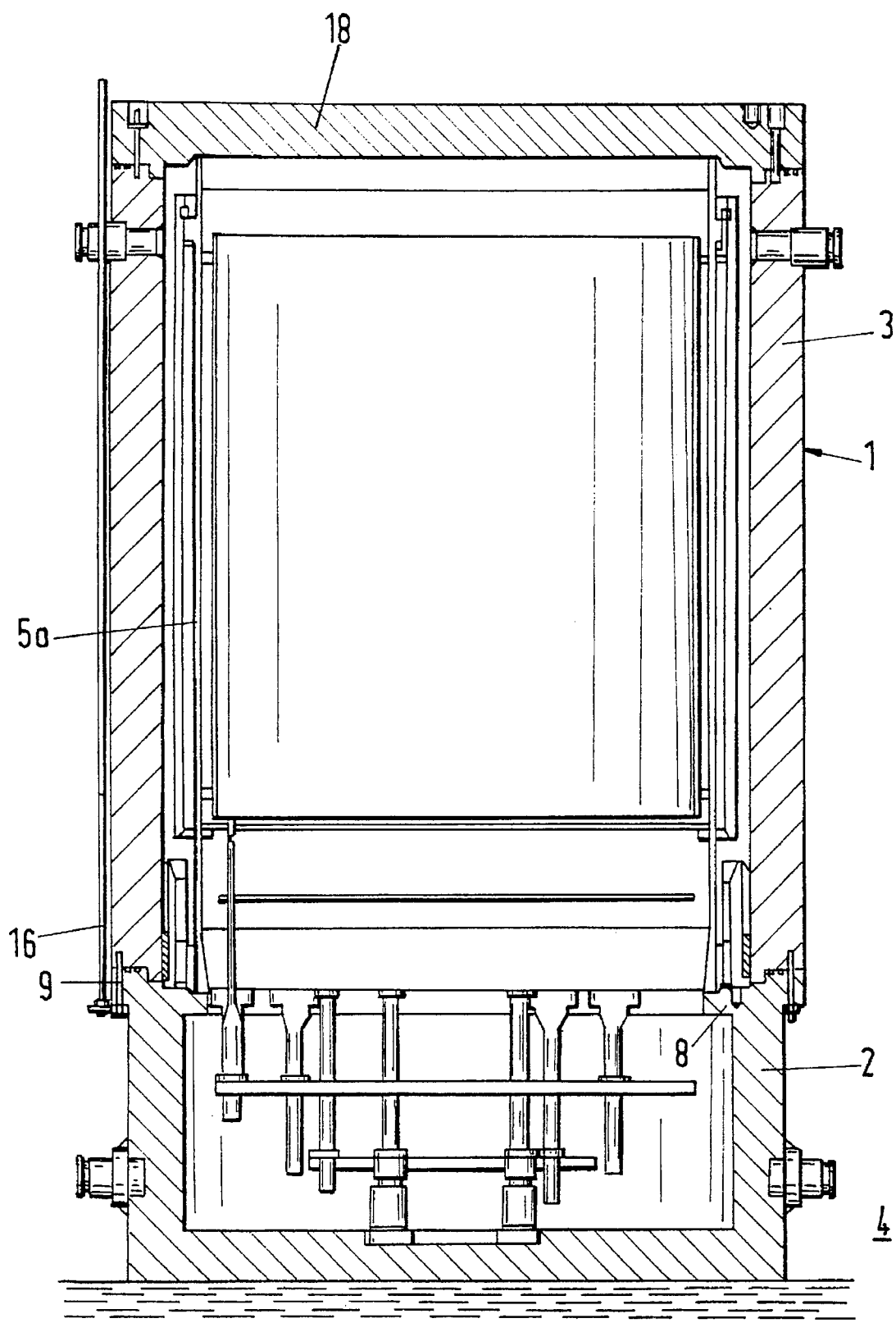
FIG. 3 is a partly longitudinal-sectional view of a closed transport container.

As is evident from FIG. 3, a lower part 5a of the core container 5 has remained in the transport container 1 after separation and is left in the transport container. The transport container 1 is closed through the use of a cover 18. The dismantling of the core container into two parts being adapted to the transport-container dimensions is thus brought about without additional holding elements for the core container. A remotely controllable tool for making or releasing the screw connection 9 is designated by reference numeral 16.

I claim:

1. A method for dismantling bulky parts of pressure-vessel fittings of a nuclear plant into transportable parts of smaller sizes, which comprises:

a) setting down a bottom part of an open transport container on a bottom of a water tank;

b) inserting a bulky part into the bottom part of the open transport container;

c) moving a casing part of the open transport container over the inserted bulky part like a sleeve until the casing part contacts the bottom part and the bulky part projects a predeterminable amount above an end surface of the casing part;

d) connecting the casing part to the bottom part;

e) supporting a separating device on the end surface of the transport container and fixing the separating device relative to the transport container; and f) separating the bulky part above the end surface of the casing part with the separating device.

* * * * *